Figure 1:
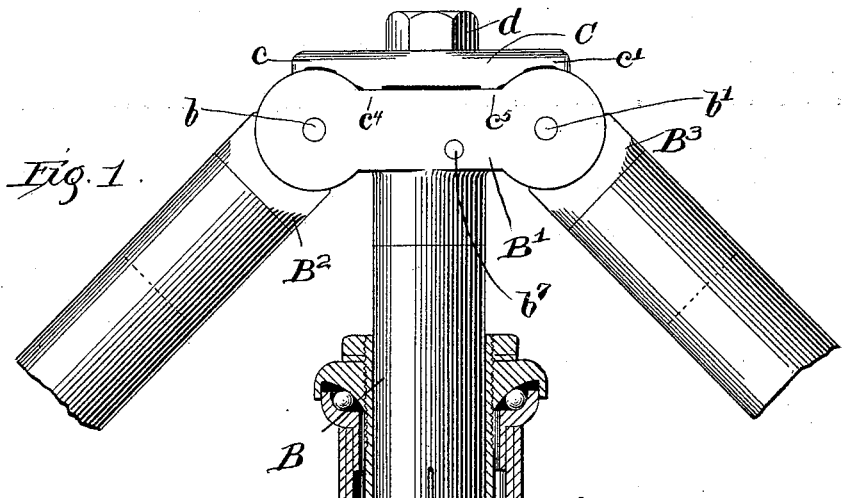

(No Model.)

W. C. DAYHOFF.
ADJUSTABLE HANDLE BAR FOR BICYCLES.

No. 606,192.

Patented June 28, 1898.

Witnesses:
Chas. A. Hervey
R. O. Bailey

Inventor:
William C. Dayhoff
by Miles Munroe Bitner
His Atty.

United States Patent Office.

WILLIAM C. DAYHOFF, OF KANKAKEE, ILLINOIS, ASSIGNOR OF ONE-HALF TO DANIEL H. PADDOCK, OF SAME PLACE.

ADJUSTABLE HANDLE-BAR FOR BICYCLES.

SPECIFICATION forming part of Letters Patent No. 606,192, dated June 28, 1898.

Application filed February 23, 1897. Serial No. 624,526. (No model.)

*To all whom it may concern:*

Be it known that I, WILLIAM C. DAYHOFF, a citizen of the United States of America, residing at Kankakee, in the county of Kankakee and State of Illinois, have invented certain new and useful Improvements in Adjustable Handle-Bars for Bicycles, of which the following is a specification.

My invention relates to certain new and useful improvements in a bicycle handle-bar for bicycles and the like, the object of the invention being to provide simple and attractive means whereby the handle-bars of a bicycle may be adjusted pivotally upon their inner ends and vertically in the steering-head of the bicycle.

It is desirable that there be a wide range of adjustment in a bicycle handle-bar for the reason that riders vary greatly in taste, one rider preferring very low handle-bars and another very high ones. For this reason it is preferable that the handle-bar as a whole be adjustable bodily in the vertical direction and also that the respective members of the bar be adjustable pivotally upon their inner ends, so that the angle of the said members to the steering-head may be varied and the range of adjustment greatly increased. It is my desire to provide improved means for both of these adjustments; and to such end my invention consists in certain novel features of construction, which will be fully described below and closely defined in the claims at the end of this specification.

For the purpose of illustrating my invention I have shown in the drawings presented herewith two figures, of which—

Figure 2:
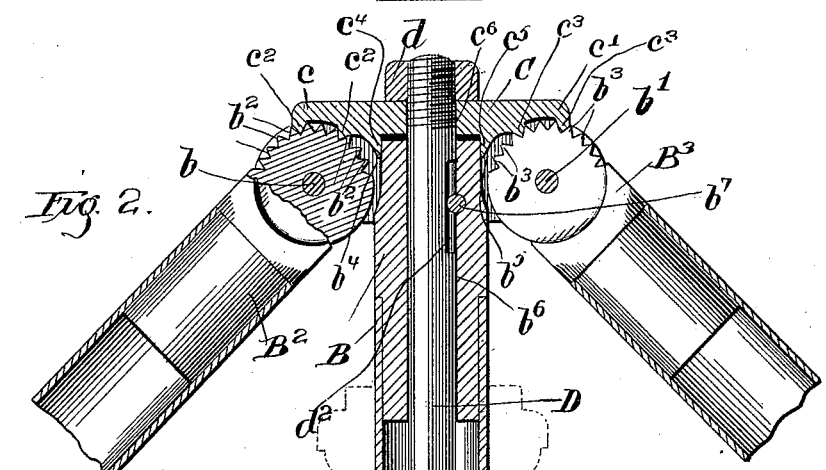

Figure 1 is a front elevation of a handle-bar embodying my invention; and Fig. 2 is a diametrical longitudinal section of the same in a plane parallel with the surface of the paper in Fig. 1, the outer ends of the handle-bars being broken away in both figures to enable the remainder to be drawn upon a larger scale than would otherwise be possible.

Referring to the drawings, which show the preferred form of my invention, the upper portion of the steering-head of the bicycle will be seen at A, and in the same will be seen the lower portion of the upright shank B of the handle-bar, said shank terminating at the top in a T-shaped head B', upon the opposite sides of which are pivoted the respective members $B^2$ $B^3$ of the handle-bar by means of pins $b$ $b'$. The inner ends of these members are each formed in the shape of an arc about the pivot-pin and provided with ratchet-teeth $b^2$ $b^3$. Across the top of the T-shaped head is a long washer C, having its opposite ends $c$ $c'$ concave upon the under side and provided with teeth $c^2$ $c^3$, adapted to engage with those upon the inner ends of the members $B^2 B^3$. Said washer also has downwardly-projecting lugs $c^4$ $c^5$, and sockets $b^4$ $b^5$ are provided in the T-shaped head to receive said lugs and assist in preventing horizontal movement of the washer in any direction. The washer and T-shaped head are respectively provided with central holes $c^6$ $b^6$, and a bolt D extends through these holes and is provided with a nut $d$ at the top and at the bottom, which projects slightly from the lower end of the shank A. It has a tapered head $d'$, adapted to wedge upward into the shank B. The lower part of the latter is preferably slit to allow it to expand within the steering-head A.

The bolt D has a notch $d^2$, and a pin $b^7$ is passed through the T-shaped head and through this notch to prevent the bolt from turning and from falling down into the steering-head when the nut $d$ is removed.

In operation the tightening of the nut $d$ wedges the tapered head $d'$ upward into the shank B, firmly wedging the latter in the steering-head A, and at the same time draws the long washer C downward and secures the opposite members or handles against pivotal movement upon the pivot-pins. The washer C is slightly crowned, so that the tightening of the bolt springs the ends down upon the ratchet-teeth, providing for the taking up of any wear and also insuring a close engagement with said teeth to prevent any looseness or play thereon.

I claim as new and desire to secure by Letters Patent—

1. The combination with the steering-head of a bicycle, of a handle-bar having a shank telescoping therein and slit at the bottom, a pair of handles pivoted upon said shank in their own plane and in lines substantially at right angles to themselves and provided upon their inner ends with ratchet-teeth, a long washer extending from one of said handles to the other and provided at its ends with teeth adapted to engage with said ratchet-teeth and a bolt extending through said washer and shank, said bolt being provided at the top with a nut and at the bottom with a tapered head adapted to expand the shank whereby the tightening of the nut upon the bolt secures the handles upon the shank and the shank in the steering-head; substantially as described.

2. The combination with the steering-head, A, of a handle-bar consisting of the shank, B, having a T-shaped head, $B^7$, and the pin, $b^7$, the handles, $B^2$, $B^3$, pivoted in the head and having ratchet-teeth upon their inner ends, the washer, C, engaging the ratchet-teeth, and the bolt, D, having the nut, $d$, above the washer and the tapered end, $d'$, adapted to expand the bottom of the shank, said bolt being held against rotation and being limited as to vertical movement by the pin, $b^7$; substantially as described.

In testimony whereof I have hereunto set my hand, at Kankakee, county of Kankakee, and State of Illinois, this 16th day of February, A. D. 1897.

WILLIAM C. DAYHOFF.

Witnesses:
CHAS. O. SHERVEY,
R. O. BAILEY.